(12) United States Patent
Ratliff et al.

(10) Patent No.: US 8,429,924 B2
(45) Date of Patent: Apr. 30, 2013

(54) FUEL MANAGEMENT SYSTEM FOR PUBLIC SERVICE VEHICLES

(76) Inventors: David E. Ratliff, Loganville, GA (US); Gregory S. Davis, Winder, GA (US)

( * ) Notice: Subject to any disclaimer, the term of this patent is extended or adjusted under 35 U.S.C. 154(b) by 814 days.

(21) Appl. No.: 12/459,297

(22) Filed: Jun. 30, 2009

(65) Prior Publication Data

US 2010/0326747 A1  Dec. 30, 2010

(51) Int. Cl.
*F25B 27/00* (2006.01)
*F25B 1/00* (2006.01)
*B60H 1/32* (2006.01)

(52) U.S. Cl.
USPC .............. 62/323.3; 62/244; 62/228.3

(58) Field of Classification Search ........... 62/228.3, 62/126, 236, 243, 244, 323.3; 180/53.8
See application file for complete search history.

(56) References Cited

U.S. PATENT DOCUMENTS

| | | | |
|---|---|---|---|
| 2002/0121100 A1* | 9/2002 | Yabuki et al. | 62/228.1 |
| 2005/0044873 A1* | 3/2005 | Tamai et al. | 62/323.1 |
| 2008/0110189 A1* | 5/2008 | Alston et al. | 62/236 |
| 2009/0018719 A1* | 1/2009 | Oakes | 701/30 |

FOREIGN PATENT DOCUMENTS

| | | | |
|---|---|---|---|
| DE | 19510110 A1 | * | 9/1996 |
| JP | 2003138956 A | * | 5/2003 |

* cited by examiner

*Primary Examiner* — Chen Wen Jiang
(74) *Attorney, Agent, or Firm* — Coulter Henry, Esq.

(57) ABSTRACT

The present invention includes a novel fuel management and auxiliary power system and apparatus having a control module in control of auxiliary equipment and accessories and climate control functions of a vehicle, while the vehicle's engine is not running. The system of this invention is capable of detecting warning states and providing status indicators to an operator on a graphical user interface. At the graphical user interface, the operator is capable of initiating start up of the system and accessing status and historical technical data of the system.

14 Claims, 6 Drawing Sheets

FUEL MANAGEMENT SYSTEM FOR PUBLIC SERVICE VEHICLES

FIELD OF THE INVENTION

This invention relates to an improved fuel and maintenance management system for public service vehicles. More particularly, the present invention relates to fuel saving systems utilizing an integrated auxiliary battery and management system to provide power to auxiliary equipment when the vehicle's engine is not in operation.

BACKGROUND OF THE INVENTION

Recently, the severity of the air pollution, occasioned by noxious gases, such as $NO_x$, CO and $CO_2$, in the exhaust of automobiles and other motor vehicles has been increasing. As a result, individual automobile companies, in compliance with exhaust emission restrictions, have developed various types of low-emission and fuel economic vehicles. However, while these advances may produce lower levels of pollution, they do not address the constant fuel consumption waste that is often necessary for public service vehicles as those vehicles are used in regular working shifts. Additionally, the increasing prices of gas have caused havoc with municipalities to keep fleet vehicles in operation, as they face budgetary constraints.

On these working shifts, it is often necessary to leave a vehicle idling with the engine running to power auxiliary equipment in the vehicle. For example, in public service vehicles, such as police cars, it is necessary to keep the vehicle idling to power equipment, as the officer is on a call or monitoring highway traffic. More specifically, because the officer is in need of equipment, such as sirens, CB radios, radar, climate controls, air conditioning and computers, the officer is forced to leave the vehicle's engine on and idling for extended periods of time. Research has shown that, while the average police vehicle's 230 HP engine is idling to provide electrical power to this equipment, only approximately 2.68 HP or 2000 Watts is actually needed. This research has also shown that while this engine is idling for 2 hours, it consumes approximately 1 gallon of fuel. This type of use is a significant cause of the budgetary constraints and amounts to significant amounts of wasted fuel each day while fleet vehicles operate and idle. These increased budgetary constraints become particularly important as the cost of fuel rises and becomes more unpredictable. For example, in a larger public municipalities having 600 fleet vehicles (assuming for this example: (a) 200 vehicles/per 8 hour shift, (b) idling (on average) 4 hours per shift and (c) $2.00/per gallon of fuel), this equates to $800 per shift or $2400 per day in fuel consumed only to provide power to the auxiliary equipment. Over the course of a year, this use can easily cost a public municipality upwards of $1 M in fuel waste during the idling periods used in this example. Accordingly, there is a need for a system that can reduce the engine idle time of public service vehicles, thus reducing fuel consumption, while providing the power necessary to run equipment used during a normal working shift.

While these costs may not affect larger municipalities as significantly as smaller municipalities, there are other factors in this type of use that can have significant additional effects on the budgets of these entities. For example, because an engine is constantly running in this idling manner, engine maintenance is substantially more frequent than the average vehicle. Accordingly, the maintenance frequency and costs of public service vehicles are significantly higher than the average vehicle simply because the engine run/idle times are significantly more frequent. Finally, because of the engine run time required in normal public service use, the life cycle of a public service vehicle is shortened. As a result, municipalities are required to replace vehicles more frequently. Therefore, there is also a need for a system that is capable of reducing the maintenance cycle and increasing the life cycle of a public service vehicle.

SUMMARY OF INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

To resolve the problems mentioned above, an object of the present invention is to provide a fuel saving apparatus and system that can, in combination with a control module provide power to vehicle cooling systems and auxiliary equipment, for extended periods of time, while the vehicle engine is not in operation.

It is another object of the present invention to provide a rechargeable battery system connected to the fuel saving system and apparatus, such that when the vehicle's engine is in operation, the fuel saving apparatus may be recharged for use at later time.

It is yet another object of the present invention to have efficient DC motors electrically connected to the fuel saving apparatus and system so that minimal electrical load is needed to power the vehicle's auxiliary equipment.

It is yet another object of the present invention to provide an efficient mechanical connection between the vehicle's engine and the fuel saving apparatus such that the fuel saving apparatus does not cause unnecessary load on the engine when the engine is in operation and the fuels saving apparatus is installed on the vehicle.

Finally, the present invention efficiently enables a vehicle to use auxiliary power produced by the system and to utilize this auxiliary power for extended periods of time.

Still other objects of the present invention will become readily apparent to those skilled in this art from the following description wherein there is shown and described the embodiments of this invention, simply by way of illustration of the best modes suited to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

Various exemplary embodiments of this invention will be described in detail, wherein like reference numerals refer to identical or similar components, with reference to the following figures, wherein.

DESCRIPTION OF THE PREFERRED EMBODIMENT

The claimed subject matter is now described with reference to the drawings. In the following description, for purposes of explanation, numerous specific details are set forth in order to provide a thorough understanding of the claimed subject matter. It may be evident, however, that the claimed subject matter may be practiced with or without any combination of these specific details, without departing from the spirit and scope of this invention and the claims.

As used in this application, the terms "component", "module", "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution (and/or control programs) and a component may be localized on one computer and/or distributed between two or more computers. As another example, an interface can include input/output (I/O) components as well as associated processor, application, and/or API components, and can be as simple as a command line or a more complex Integrated Development Environment (IDE).

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic instructions or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 1:
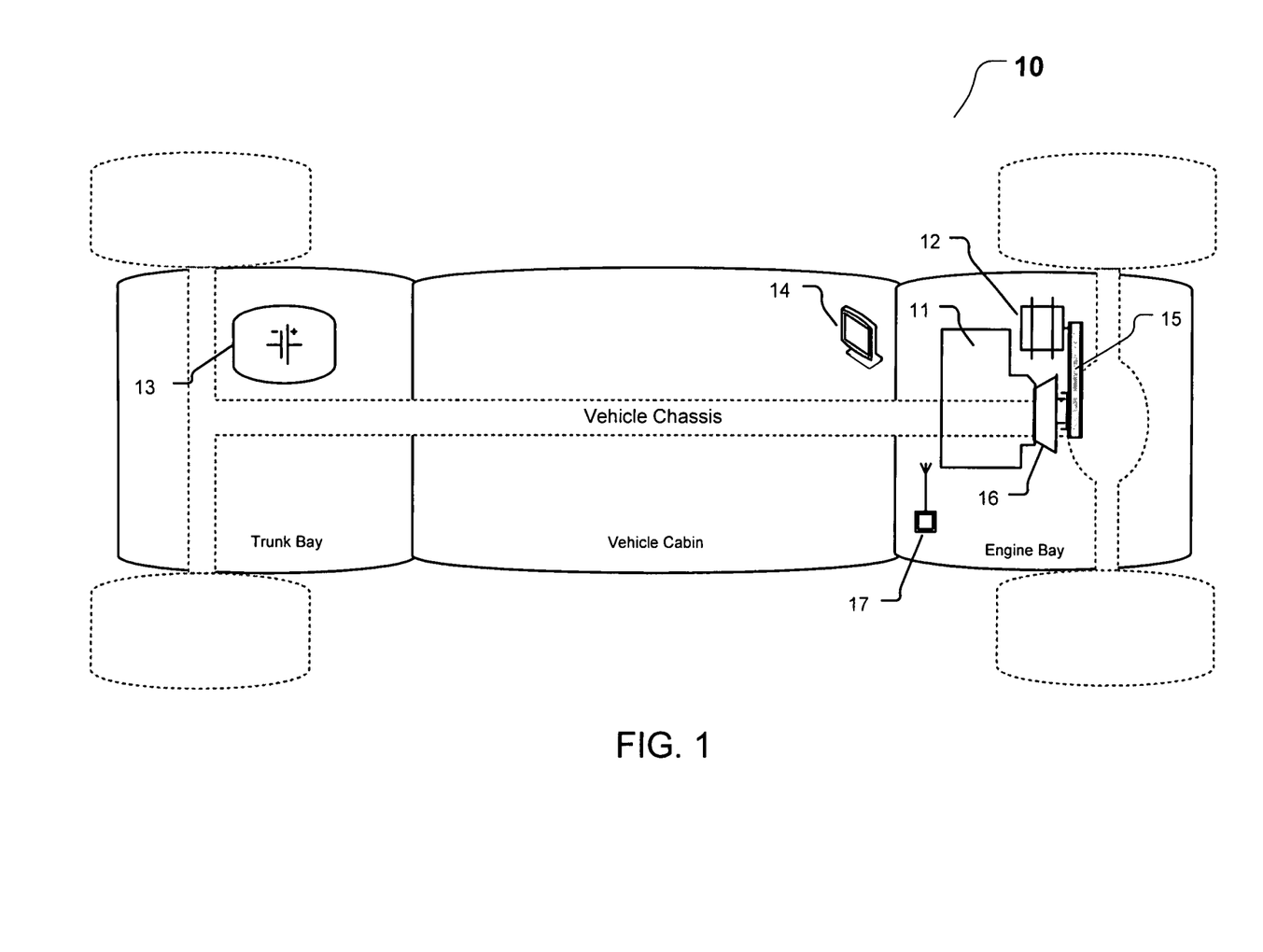
FIG. 1 is a schematic block diagram of the hybrid-idle system and apparatus of the present invention, as it is installed in a vehicle.

FIG. 1 is a schematic block diagram showing the configuration of the hybrid-idle system and apparatus 10 according to an embodiment of the invention, as installed in a vehicle.

The hybrid-idle system and apparatus 10, when installed into a vehicle, allows the vehicle operator to switch off the vehicle engine 11 and provide power to all auxiliary vehicle equipment. In the preferred application, the hybrid-idle system and apparatus 10 provides an adequate amount of power to operate the vehicle equipment for extended periods of time. Operation of each component shown in FIG. 1 will be described in greater detail in FIG. 2. FIG. 1 is presented simply to provide an overview of the preferred installation of the hybrid-idle system and apparatus 10. However, it should be appreciated that different system and installation configurations are available without departing from the scope of this invention. Also, it should be appreciated that substitute and equivalent components of the hybrid-idle system and apparatus 10 may be necessary to fit the particular installation application. For example, the DC deep cycle battery 13 may be substituted with traditional DC batteries to fit the particular installation.

In the engine bay of the vehicle, as shown in FIG. 1, the hybrid-idle system and apparatus 10 has a brushless DC motor 12 that is mechanically connected to an air conditioner (A/C) compressor 16 previously existing on vehicle engine 11. The mechanical connection between the brushless DC motor 12 and air conditioner (A/C) compressor 16 is accomplished using a v-belt and pulley system 15. Also contained in the engine bay is a system control module 17 which provides operation, switching and control of the hybrid-idle system and apparatus 10. The system control module 17 is electrically and bi-directionally connected to graphical user interface 14 contained in the vehicle cabin. The graphical user interface 14 serves as an input and display terminal for the operator so that the status, operation, programming and input for the hybrid-idle system and apparatus 10 can be controlled by the operator at the graphical user interface 14. The graphical user interface 14 may also display of the charge levels of the DC deep cycle battery 13, power consumption levels and fuel savings calculations of the hybrid-idle system and apparatus 10. The graphical user interface 14 may additionally provide an administrator mode where technicians can access diagnostic and configuration settings from a diagnostic port or via a wireless connection with a laptop computer (not shown) or the like. The graphical user interface 14 and the system control module 17 may also be implemented by use of the on-board computer system already installed in the vehicle. For example, the monitoring and display as described above may be provided by the Drive Connected™ system produced by Hughes Telematics, Inc. of Atlanta, Ga.

As described in further detail below with respect to FIG. 2, the DC deep cycle battery 13 is electrically connected to provide power to the brushless DC motor 12, graphical user interface 14, system control module 17 and other components of the hybrid-idle system and apparatus 10. While the DC deep cycle battery 13 is shown in the trunk bay of the vehicle, it should be appreciated that the DC deep cycle battery 13 could be located anywhere in the vehicle. Finally, while the preferred embodiment described herein depicts DC deep cycle battery 13 separate from the existing vehicle battery (not shown), it should be appreciated that the hybrid-idle system and apparatus 10 could receive electrical power from the existing vehicle battery without departing from the scope of this invention. However, the preferred embodiment provides the DC deep cycle battery 13 so that the hybrid-idle system and apparatus 10 does not cause unnecessary drain on the existing vehicle battery, to provide more efficient operation and to ease installation of the hybrid-idle system and apparatus 10.

In operation, the operator may, for example, park the vehicle with the auxiliary equipment and engine running. When the operator activates the hybrid-idle system and apparatus 10 and then shuts off the vehicle's engine, the hybrid-idle system and apparatus 10 then immediately provides power to the auxiliary equipment in the vehicle.

Other methods to activate the hybrid-idle system and apparatus 10 are also available without departing from the scope of this invention. For example, the hybrid-idle system and apparatus 10 may be automatically activated; using an automatic mode, when the hybrid-idle system and apparatus 10 detects the vehicle's engine has been shut off. This automatic activation may be dependent on the time of day or the day of the week. For example, when in an automatic mode, the hybrid-idle system and apparatus 10 may be programmed to detect, using a work schedule function that the operator is not on a working shift and override the automatic activation function.

Figure 2:
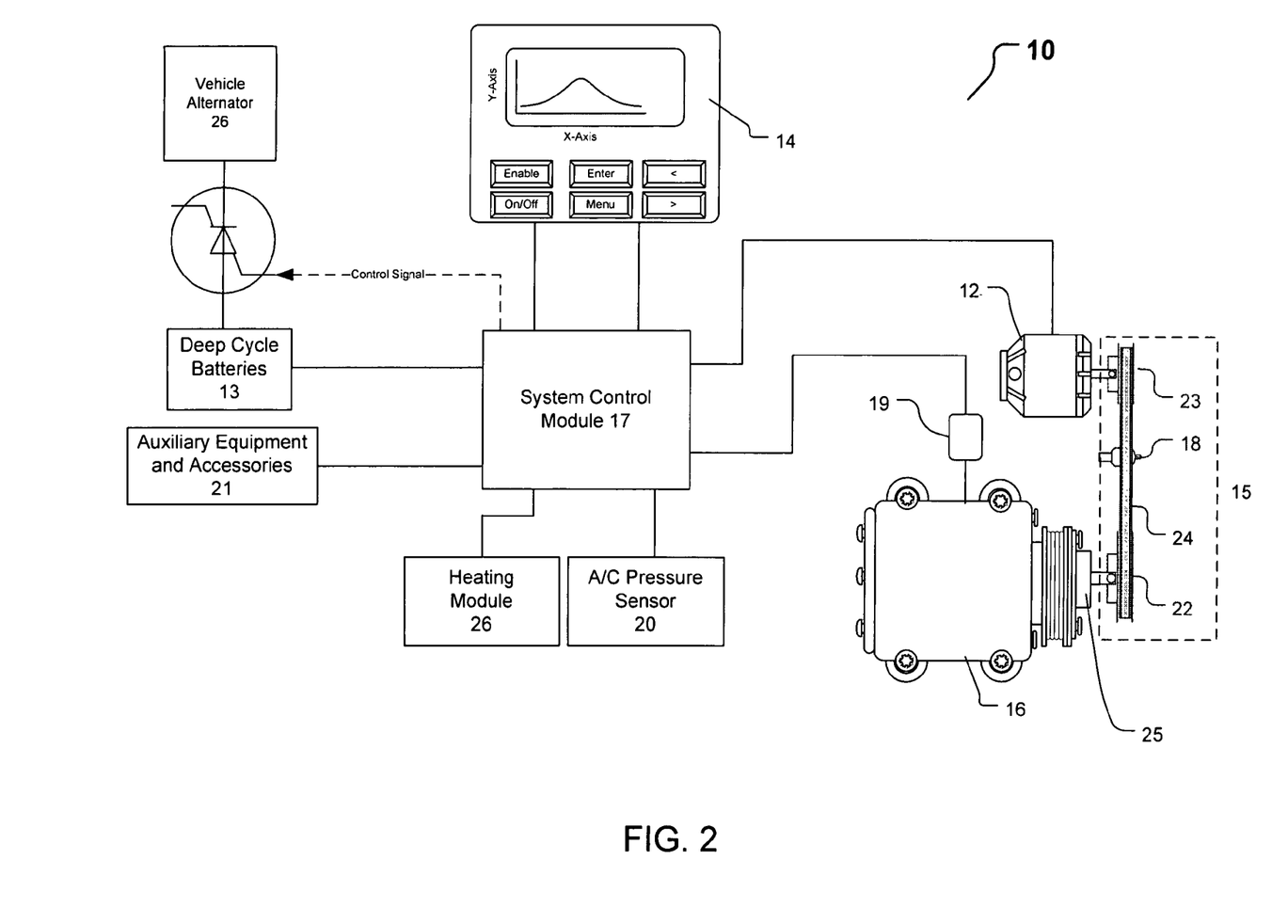
FIG. 2 is an expanded schematic block diagram of a first hybrid-idle system and apparatus of the present invention.

FIG. 2 provides a more detailed explanation of the operation of the first embodiment of the hybrid-idle system and apparatus 10 and each of its components, according to this invention. As described above, once the operator shuts off the vehicle's engine, the hybrid-idle system and apparatus 10 immediately provides power to the auxiliary equipment and accessories 21 via the DC deep cycle battery 13. Next, the system control module 17 then determines the status of the climate controls in the vehicle and decides whether to activate the air conditioner (A/C) compressor 16 or the heating module 26 and the vehicle's cabin air blower motor.

If the heating module 26 is needed, the system control module 17 activates the heating module 26 and awaits adjustment of the climate controls or a system shutdown command from the operator at the graphical user interface 14.

If the air conditioner (A/C) compressor 16 is needed, as determined by the system control module 17, the hybrid-idle system and apparatus 10 then reads the status of high and low pressure sensors (not shown) contained within the A/C pressure sensor 20 to ensure that there aren't dangerous levels of pressure already in the vehicle's air conditioning lines (not shown). If the pressure measurements from the A/C pressure sensor 20 are within acceptable limits, the system control module 17 will activate the brushless DC motor 12 by providing electrical power from the DC deep cycle battery 13.

Upon activation, the brushless DC motor 12 produces rotational force and torque to turn a connector between the brushless DC motor 12 and the v-belt and pulley system 15. The specific type of connector and coupling between the brushless DC motor 12 and v-belt and pulley system 15 can be any well known connector suitable for provide rotational force to the v-belt and pulley system 15, such as, but not limited to, a direct drive shaft.

As shown in FIG. 2, the v-belt and pulley system 15 includes a first gear 23 and a second gear 22 that are coupled together using a v-belt 24. The v-belt 24 can be any now known or later developed automobile drive/timing belt. Tension is provided on the v-belt 24 during operation of the hybrid-idle system and apparatus 10 by the bearing idler belt tensioner 18. As the brushless DC motor 12 begins to spin and generate torque at the first gear 23, the bearing idler belt tensioner 18 provides tension to the v-belt 24 such that the brushless DC motor 12 can over come the frictional forces and load provided by mechanical connection between the second gear 22 and the air conditioner (A/C) compressor 16. The rotational motion of the first gear 23 is transmitted to the second gear 22 through the v-belt 24.

For those who have expertise in the field, it is obvious that other parts could be added to or reconfigured on this system to improve efficiency and/or simplify the control strategy. For example, the first gear 23 may be smaller than the second gear 22 to provide an efficient and small loss gear ratio for the hybrid-idle system and apparatus 10. Also, as shown in FIG. 2, a one-way clutch 25 may be added on the connection between the second gear 22 and the air conditioner (A/C) compressor 16. The purpose of the one-way clutch 25 is to engage and disengage the rotation of the second gear 22 and to keep the v-belt and pulley system 15 from moving during normal operation and driving.

In this embodiment and example, the second gear 22 is coupled to the one-way clutch 25. When engaged, the one-way clutch 25 transmits the rotational force from the second gear 22 to the air conditioner (A/C) compressor 16. The one-way clutch 25 serves as an over-running clutch allowing torque transmission from the one-way clutch 25 to the air conditioner (A/C) compressor 16, while blocking torque and vibration transmission from other rotating parts when the hybrid-idle system and apparatus 10 is not in operation. This configuration provides efficiency and nominal frictional losses through the mechanical connections.

The one-way clutch 25 can be engaged electrically, hydraulically, or electro-hydraulically. For example, the one-way clutch 25 can receive a control signal from the system control module 17 via the A/C clutch control 19. The control signal may be a pulse width modulated signal to engage, partially engage, and disengage, the one-way clutch 25 based on operating conditions input by the operator using graphical user interface 14, or due to override conditions, as described herein. The A/C clutch control 19 engages and disengages the one-way clutch 25 from the air conditioner (A/C) compressor 16 as indicated by the control signal from the system control module 17.

The A/C clutch control 19 may also provide pressure measurements of the one-way clutch 25 as provided by the bearing idler belt tensioner 18. The A/C clutch control 19 can output the pressure measurements to the system control module 17 to determine if the bearing idler belt tensioner 18 has achieved a minimum amount of tension on the v-belt 24 as the brushless DC motor 12 begins to spin. If the pressure on the one-way clutch 25 is above a predetermined range, the system control module 17 may provide a control signal to the A/C clutch control 19 to engage the one-way clutch 25. If the pressure measurements are below the range, the system control module 17 determines that the one-way clutch 25 has not engaged and a backup procedure can be performed, such as measuring the pressure again and providing additional control signals attempting to engage the one-way clutch. If there continues to be an error, the clutch is not engaged and the operator is notified of the problem on the graphical user interface 14.

Once the operator has resumed normal operation (restarted) of the vehicle engine, the system control module 17 senses the restart and disables the one-way clutch 25 and cuts electrical power from the DC deep cycle battery 13 to the auxiliary equipment and accessories 21 and brushless DC motor 12.

In an additional embodiment, as the vehicle engine is in its normal operation state, the system control module 17 sends a control signal to a switch to electrically connect the DC deep cycle battery 13 to the existing vehicle alternator 26 for recharging the DC deep cycle battery 13. Once the DC deep cycle battery 13 has reached the desired charge level, the system control module 17 may disconnect the vehicle alternator 26 from the DC deep cycle battery 13.

Figure 3:
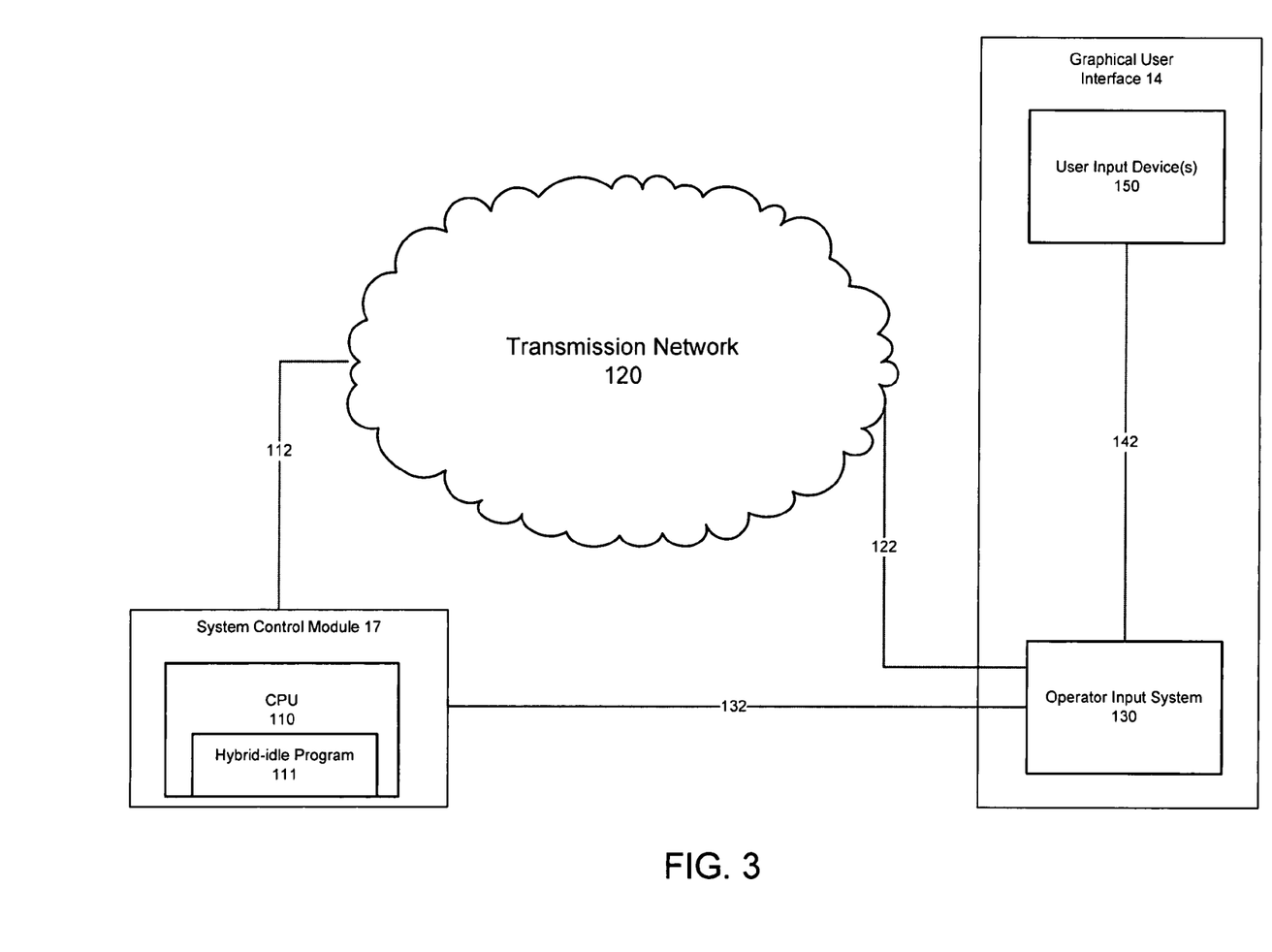
FIG. 3 represents a block diagram depicting an exemplary embodiment of the first hybrid-idle system according to this invention.

FIG. 3 shows one exemplary embodiment of the connection between the system control module 17 and the graphical user interface 14 of FIG. 2. The graphical user interface 14 includes an operator input system 130. As shown in FIG. 3, one or more user input devices 150 are connected to the operator input system 130 via one or more communication links 142. The one or more user input devices 150 can be any known or later-developed device usable to input data and/or commands, such as a keyboard, a mouse, a voice recognition system, a digital ink pen, a trackball, a track pad or the like. The operator input system 130 is connected to a CPU 110 of the system control module 17 either directly over a link 132 or over links 122 and 112 and a transmission network 120 of the system control module 17.

The bidirectional links 112, 122, 132 and 142 and the transmission network 120 can be any now known or later-developed device or system usable to connect the one or more user input devices 150 and the CPU 110 to the operator input system 130, including, but not limited to, a direct cable connection, a connection over a wide area network or a local network, a connection over an intranet or a connection over an extranet, a connection over the Internet, a wireless connection, or a connection over any other distributed processing network or system. In general, the links 112, 122, 132 and 142 and the transmission network 120 can be any appropriate known or later-developed connection system and/or structure for transferring information, such as computer readable program code, a carrier wave and/or any other type of executable program or instruction.

The CPU 110 contains a hybrid-idle program 111. Program and status data, such as text, can be retrieved by the operator input system 130 from the hybrid-idle program 111 through CPU 110 and collaboratively shared by the components of the operator input system 130. It should be appreciated that CPU 110 can be a local or remotely located computer, or any other known or later-developed system usable to generate electronic data. Similarly, the CPU 110 can be any suitable device that stores and/or transmits electronic system and status data, such as a client or a server of a network. The CPU 110 can be integrated with the operator input system 130 or may be remotely connected to the operator input system 130, such as over the transmission network 120.

It should also be appreciated that the hybrid-idle program 111 is preferably dynamically implemented on a general-purpose computer, for example CPU 110. However, the hybrid-idle program 111 can also be implemented on a special purpose computer, a programmed microprocessor or microcontroller and peripheral integrated circuit elements, an ASIC or other integrated circuit, digital signal processor, hardwired electronic or logic circuit such as discrete element circuit, programmable logic device such as PLD, PLA, FPGA or PAL, or the like. In general, any device capable of supplying appropriate hybrid-idle data that can be used.

Figure 4:
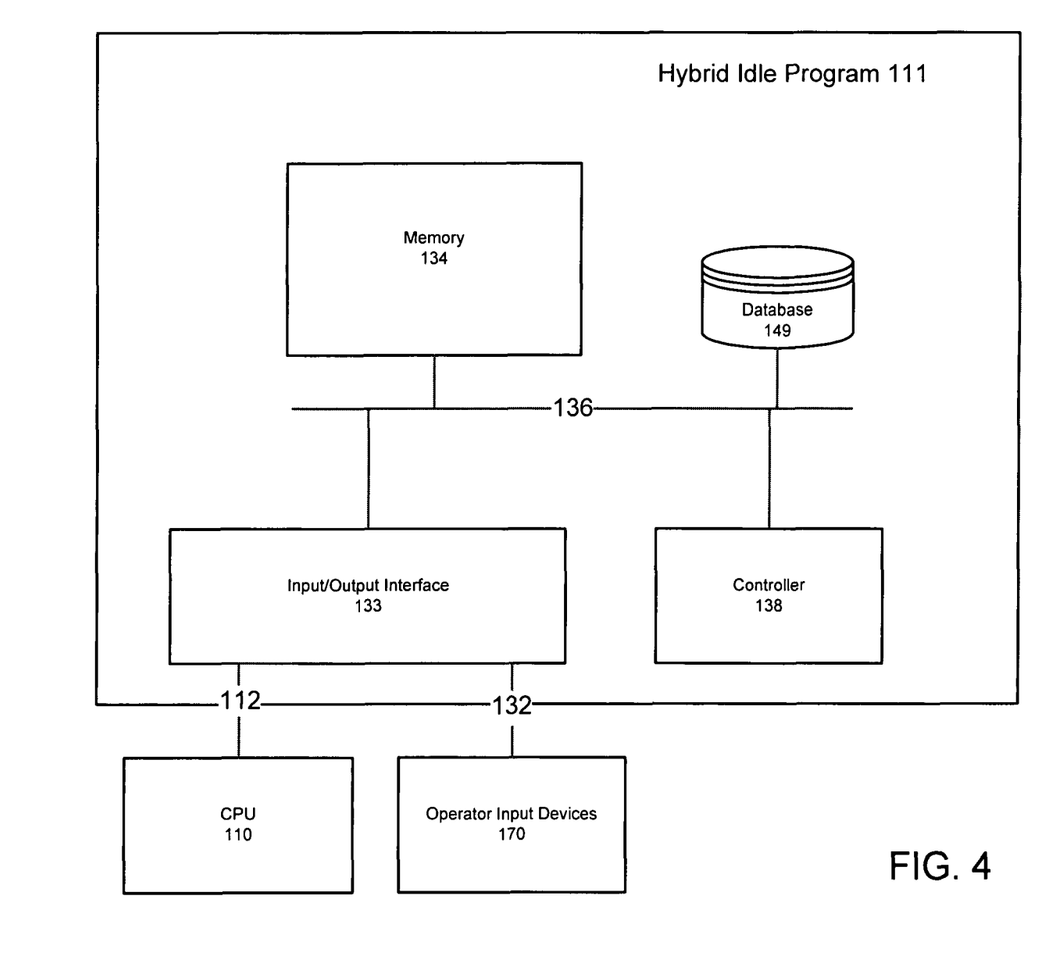
FIG. 4 represents a block diagram depicting one exemplary embodiment of a connection method between the systems control module and the graphical user interface according to this invention.

FIG. 4 shows one exemplary embodiment of various components of the hybrid-idle program 111 according to this invention. As shown, the hybrid-idle program 111 includes an input/output interface 133, controller 138, memory 134, and database 149, each interconnected by one or more bidirectional data/control buses or application programming interfaces 136. As further shown in FIG. 4, one or more operator input devices 170 are connected over one or more links 132 to the input/output interface 133. The operator input device 170 includes the user input device 150 and the operator input system 130 from FIG. 3. Additionally, CPU 110 is connected over communication link 112 to the input/output interface 133.

Figure 5:
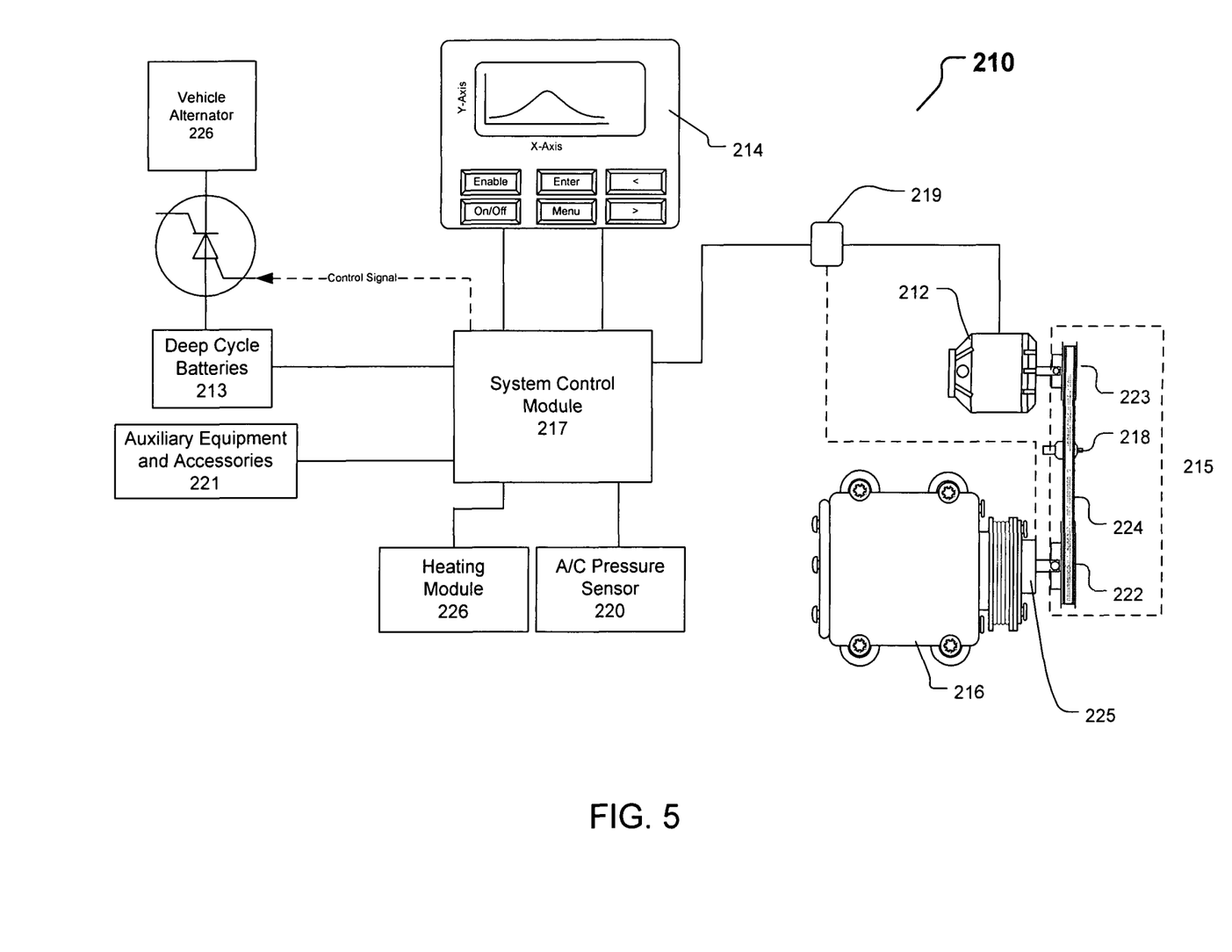
FIG. 5 is an expanded schematic block diagram of a second hybrid-idle system and apparatus of the present invention.

It should be understood that each of the circuits or routines shown in FIGS. 4 and 5 could be implemented as portions of suitably programmed general-purpose computer. Alternatively, each of the circuits or routines in FIGS. 3 and 4 could be implemented as physically distinct hardware circuits within an ASIC, or using FPGA, PDL, PLA or PAL, digital signal processor, or using discrete logic elements or discrete circuit elements. The particular form of each of the circuits or routines shown in FIGS. 3 and 4 will take is a design choice and will be obvious and predictable to those skilled in the art.

Each of the links 112 and 132 can be implemented using any known or later developed device or system for connecting the one or more operator input devices 170 and CPU 110, respectively to the hybrid-idle program 111, including direct cable connection, connection over wide area network, local network or storage area network, connection over an intranet, connection over the Internet, or connection over any other distributed processing network or system. In general, each of the links 112 and 132 can be any known or later developed connection system or structure usable to connect the one or more operator input devices 170 and CPU 110 to the hybrid-idle program 111.

The input/output interface 133 inputs operator input data from the CPU 110 and/or the one or more operator input devices 170 and outputs data to a display such as shown by the graphical user interface 14 in FIGS. 1-3, and 5. The input/output interface 133 also outputs the system and programming data to one or more of the controller(s) 138, the memory 134, and the database 149.

The memory 134 can store one or more computer readable control routines used by the controller 138 to operate the hybrid-idle program 111. One should also understand that the operation of the hybrid-idle program vehicle engine 111 also includes all of the control functions described above with respect to the system control module 17 of FIGS. 1, 2 and 5.

The memory 134 can be implemented using any appropriate combination of alterable, volatile or non-volatile memory or non-alterable, or fixed, memory. The alterable memory, whether volatile or non-volatile, can be implemented using any one or more of static or dynamic RAM, floppy disk and disk drive, writable or re-writable optical disk and disk drive, hard drive, flash memory or the like. Similarly, the non-alterable or fixed memory can be implemented using any one or more of ROM, PROM, EPROM, EEPROM, an optical ROM disk, such as CD-ROM or DVD-ROM disk, and disk drive or the like.

The controller 138 can be implemented as single special purpose integrated circuit (e.g., ASIC) each having main or central processor section for overall, system-level control, and separate sections dedicated to performing various different specific computations, functions and other processes under the control of the central processor section. The controller 138 can also be implemented as single microprocessor circuit or plurality of separate dedicated or programmable integrated or other electronic circuits or devices, e.g., hardwired electronic or logic circuits such as discrete element circuits or programmable logic devices. The controller 138 also preferably includes other circuitry or components, such as memory devices, relays, mechanical linkages, communications devices, etc., to affect desired control and/or input/output functions.

The database 149 can be implemented using any hardware or software means capable of producing collection of data structured and organized in disciplined fashion so that access to the information of interest is possible. The database structure can be stored in any now known or later developed way of structure, such as comma delineated.

FIG. 5 provides a detailed explanation of the operation of the second embodiment of the hybrid-idle system and apparatus 210 and each of its components. The configuration of the second embodiment of the hybrid-idle system and apparatus 210 is substantially similar to the first embodiment of the hybrid-idle system and apparatus 10 and includes all of the features and functionality of the hybrid-idle system and apparatus 10. The hybrid-idle system and apparatus 210 integrates a magnetic clutch 225 for engaging the drive shaft as shown in FIG. 5. Although at least two clutch arrangements are shown and described herein, it is to be understood that various other clutch configurations may be employed, such as for example, a disc clutch, a hydraulic clutch, a conical clutch, a jaw or claw type clutch, a spiral or ratchet type clutch, and/or any other type of clutch now known or later discovered in accordance with this invention. Again, like the first embodiment described above, once the operator shuts off the vehicle's engine, the hybrid-idle system and apparatus 210 immediately provides power to the auxiliary equipment and accessories 221 via the DC deep cycle battery 213. Next, the system control module 217 then determines the status of the climate controls in the vehicle and decides whether to activate the air conditioner (A/C) compressor 216 or the heating module 226 and the vehicle's cabin air blower motor.

If the heating module 226 is needed, the system control module 217 activates the heating module 226 and awaits adjustment of the climate controls or a system shutdown command from the operator at the graphical user interface 214.

If the air conditioner (A/C) compressor 216 is needed, as determined by the system control module 217, the hybrid-idle system and apparatus 210 then reads the status of high and low pressure sensors (not shown) contained within the A/C pressure sensor 220 to ensure that there aren't dangerous levels of pressure already in the vehicle's air conditioning lines (not shown). If the pressure measurements from the A/C pressure sensor 220 are within acceptable limits, the system control module 217 will activate the brushless DC motor 212 by providing electrical power from the DC deep cycle battery 213 and energizes magnetic clutch 225 to cause it to engage. The magnetic clutch 225 is engaged by energizing magnetic components within its housing causing the clutch to engage.

Upon activation, the brushless DC motor 212 produces rotational force and torque to turn a connector between the brushless DC motor 212 and the v-belt and pulley system 215. The specific type of connector and coupling between the brushless DC motor 212 and v-belt and pulley system 215 can be any well known connector suitable for provide rotational force to the v-belt and pulley system 215, such as, but not limited to a direct drive shaft.

As shown in FIG. 5, the v-belt and pulley system 215 includes a first gear 223 and a second gear 222 that are coupled together using a v-belt 224. The v-belt 224 can be any now known or later developed automobile drive/timing belt. Tension is provided on the v-belt 224 during operation of the hybrid-idle system and apparatus 210 by the bearing idler belt tensioner 218. As the brushless DC motor 212 begins to spin and generate torque at the first gear 223, the bearing idler belt tensioner 218 provides tension to the v-belt 224 such that the brushless DC motor 212 can over come the frictional forces and load provided by mechanical connection between the second gear 222 and the air conditioner (A/C) compressor 216. The rotational motion of the first gear 223 is transmitted to the second gear 222 through the v-belt 224.

For those who have expertise in the field, it is obvious that other parts could be added to or reconfigured on this system to improve efficiency and/or simplify the control strategy. For example, the first gear 223 may be smaller than the second gear 222 to provide an efficient and small loss gear ratio for the hybrid-idle system and apparatus 210. Also, as shown in FIG. 5, a magnetic clutch 225 may be added on the connection between the second gear 222 and the air conditioner (A/C) compressor 216. The purpose of the magnetic clutch 225 is to engage and disengage the rotation of the second gear 222 and to keep the v-belt and pulley system 215 from moving during normal operation and driving.

In this embodiment and example, the second gear 222 is coupled to the magnetic clutch 225. When engaged, the magnetic clutch 225 transmits the rotational force from the second gear 222 to the air conditioner (A/C) compressor 216. The magnetic clutch 225 allows torque transmission from the magnetic clutch 225 to the air conditioner (A/C) compressor 216, while blocking torque and vibration transmission from other rotating parts when the hybrid-idle system and apparatus 210 is not in operation and the magnetic clutch 225 is disengaged. This configuration provides efficiency and nominal frictional losses through the mechanical connections. Torque is transmitted in the magnetic clutch 225 by engagement of teeth where large torque is transmitted.

The brushless DC motor 212 at this point will spin in a direction that is opposite to the rotational direction of the engine and transfer rotational force to the magnetic clutch 225. For example, the magnetic clutch 225 can receive a control signal from the system control module 217 via the A/C clutch control 219. The control signal may be a pulse width modulated signal to engage, partially engage, and disengage, the magnetic clutch 225 based on operating conditions input by the operator using graphical user interface 214, or due to override conditions, as described herein. The A/C clutch control 219 engages and disengages the magnetic clutch 225 from the air conditioner (A/C) compressor 216 as indicated by the control signal from the system control module 217.

The A/C clutch control 219 may also provide pressure measurements of the magnetic clutch 225 as provided by the bearing idler belt tensioner 218. The A/C clutch control 219 can output the pressure measurements to the system control module 217 to determine if the bearing idler belt tensioner 218 has achieved a minimum amount of tension on the v-belt 224 as the brushless DC motor 212 begins to spin. If the pressure on the magnetic clutch 225 is above a predetermined range, the system control module 217 may provide a control signal to the A/C clutch control 219 to engage the magnetic clutch 225. If the signal is below the range, the magnetic clutch 25 is assumed to have not been engaged and a backup procedure can be performed, such as measuring the pressure again and providing additional control signals attempting to engage the magnetic clutch 225. If the pressure measurement is not within the predetermined range, the magnetic clutch 225 is not allowed to engage and the operator is notified of the problem on the graphical user interface 214.

Once the operator has resumed normal operation (restarted) of the vehicle engine, the system control module 217 senses the restart and disables the magnetic clutch 225 and cuts electrical power from the DC deep cycle battery 213 to the auxiliary equipment and accessories 221 and brushless DC motor 212.

In an additional embodiment, as the vehicle engine is in its normal operation state, the system control module 217 sends a control signal to a switch to electrically connect the DC deep cycle battery 213 to the existing vehicle alternator 226 for recharging the DC deep cycle battery 213. Once the DC deep cycle battery 213 has reached the desired charge level, the system control module 17 may disconnect the vehicle alternator 226 from the DC deep cycle battery 213.

Figure 6:
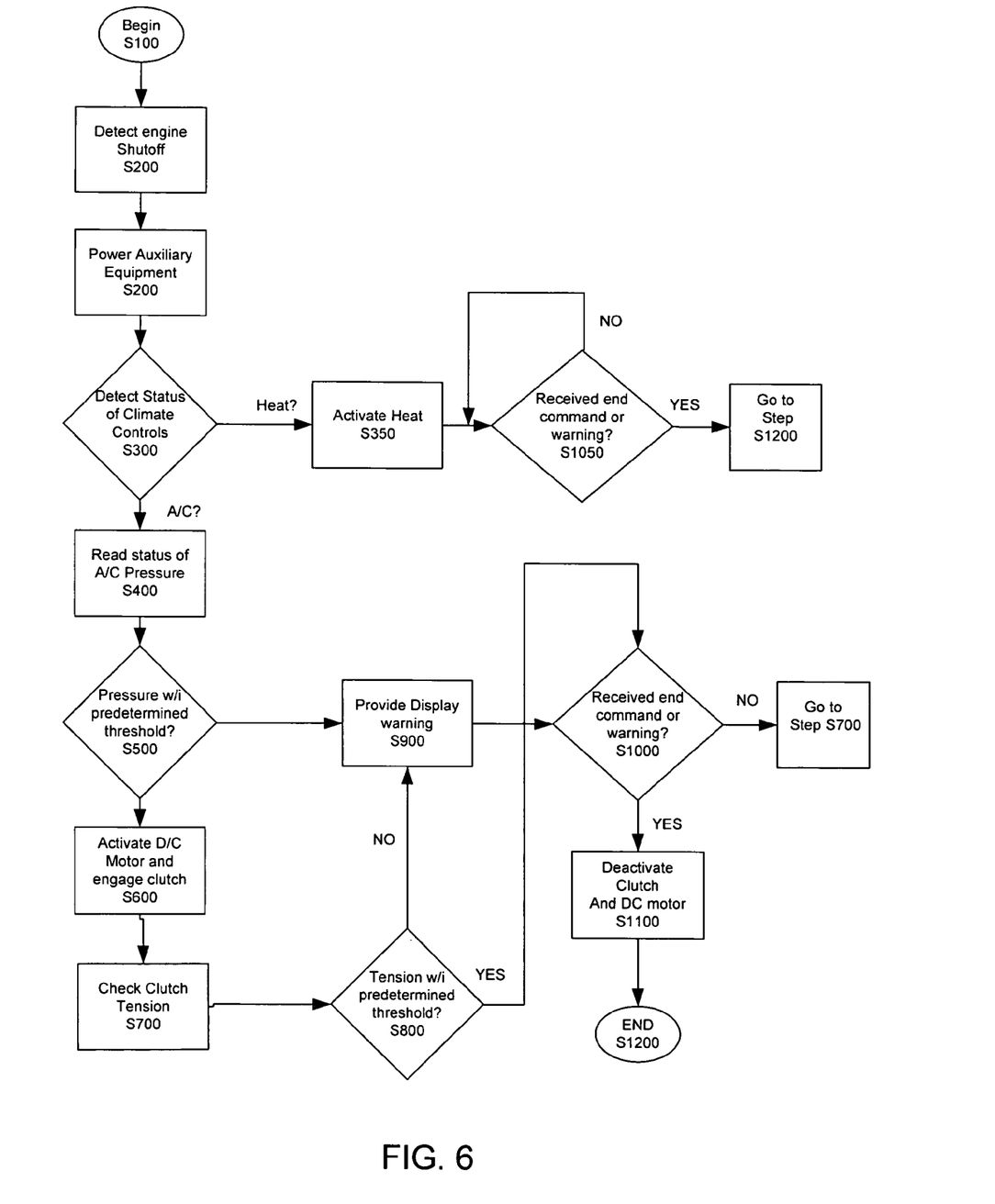
FIG. 6 represents an exemplary method of operation for the first hybrid-idle system according to this invention.

FIG. 6 represents an exemplary method for the operation of the hybrid-idle system and apparatus according to this invention. As shown in FIG. 6, operation of the method begins at step S100, and continues to step S200, where the system control module detects the shut off of the vehicle engine. The method then proceeds to step S200.

At step S200, the system control module closes a connection between the dc deep cycle battery and the auxiliary equipment and accessories. This provides power to the auxiliary equipment and accessories. The process then proceeds to step S300. At step S300, the system control module will detect the vehicle's climate control settings to determine whether to activate the heat or the air conditioner (A/C) compressor. If the detection indicates that the heating system should be activated, the process continues to step S350 where the heating system is activated. The process then continues to step S1050 where the system control module will look for a command indicating a heating malfunction or an end command from the operator via a graphical user interface.

Otherwise, at S300, if the system control module determines that the air conditioner (A/C) compressor should be activated, the process continues to step S400.

At step S400, the system control module will read the status of the A/C pressure lines from an A/C pressure sensor. The process then continues to step S500. At step S500, the system control module will determine if the pressures read from the A/C Pressure sensor are within a predetermined range. If the pressures are within the predetermined range, the process continues to S600.

Otherwise, if the pressures are not within the predetermined range the process continues to step S900 where a warning of the fault is notified to the operator via the graphical user interface. Here, the system control module will await action from the operator, such as a request to recheck the pressures measured at the A/C Pressure sensor or a request to end the operation. If a request to end operation is given the process ends at step S1200. From there, the operator may again restart the hybrid-idle system and apparatus.

At step S600 the system control module will send a control command to provide power to the brushless DC motor and send a command to the A/C clutch control to engage the one-way clutch. From there, the process proceeds to step S700.

At step S700 the system control module will instruct the A/C clutch control to read the tension on the one-way clutch as provided by the operation of the brushless DC motor and the v-belt and pulley system connected to the air conditioner (A/C) compressor. The process then proceeds to step S800 where the system control module will determine if the tension is within a predetermined range. If the tension is within the predetermined range, the process continues to S1000.

Otherwise, if the pressures are not within the predetermined range the process continues to step S900 where a warning of the fault is notified to the operator via the graphical user interface. Here, the system control module will await action from the operator, such as a request to recheck the pressures measured at the A/C Pressure sensor or a request to end the operation. If a request to end operation is given the process ends at step S1200. From there, the operator may again restart the hybrid-idle system and apparatus.

At step S1000, the system control module will check for any other faults or requests by the operator to shut down the system. If no faults or end requests are received, the process jumps back to step S700 to periodically check the tension on the one-way clutch.

If there has been a fault or an end request by the operator, the process continues to step S1100 where the system control module will deactivate the one-way clutch and then cut the power to the brushless DC motor.

Finally, the process ends at step S1200.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A system for providing electrical power to auxiliary equipment in a vehicle comprising:
    a dc battery; and
    a system control module, wherein upon the detection of a first input, the system control module electrically connects the dc battery to the auxiliary equipment and detects an ambient temperature within the vehicle,
    upon detection of the ambient temperature, the system control module selects between providing power to a heating module or a brushless motor that is connected to a clutch on a vehicle air conditioning compressor,
    if the power is selected to be provided to the brushless motor, the system control module detects a pressure within the air conditioning compressor to determine if the pressure is within a predetermined threshold; and
    if the pressure is within the predetermined threshold, the system control module provides power to the brushless motor.

2. The system of claim 1, wherein upon providing power to the brushless motor, the system control module also causes the clutch to engage and rotationally spin with the brushless motor through a mechanical connection.

3. The system of claim 2, wherein the mechanical connection is a v-belt and tensioner, wherein the tensioner is positioned to provide variable pressure on the v-belt to overcome frictional forces associated with the connections between the brushless motor, the mechanical connection and the clutch.

4. The system of claim 1, wherein the clutch is a magnetic clutch and wherein the system control module causes the clutch to engage by sending a command signal to an A/C clutch control which in turn engages the magnetic clutch.

5. The system of claim 1, wherein the clutch is a one-way clutch tooth clutch that is engaged by the spin of the brushless motor in a direction that is opposite to the rotation of a vehicle engine.

6. The system of claim 1, wherein the first input is provided from a user through a graphical user interface.

7. The system of claim 1, wherein the first input is provided from the system control module upon detection that the vehicle engine has been shut off.

8. A method for providing electrical power to auxiliary equipment in a vehicle comprising:
- detecting at a system control module a first input and the ambient temperature of the vehicle, wherein upon the detection of the first input, a system control module electrically connects a dc battery to the auxiliary equipment,
- upon detecting the ambient temperature, the system control module selects between providing power to a heating module or a brushless motor connected to a clutch on a vehicle air conditioning compressor,
- upon selecting to power the brushless motor, the system control module detects the pressure within the air conditioning compressor to determine if the pressure is within a predetermined threshold,
- if the pressure is within the predetermined threshold, the system control module proceeds with providing power to the brushless motor and issuing a command to engage the clutch.

9. The method of claim 8, wherein upon providing power to the brushless motor, the system control module also causes the clutch to engage and rotationally spin with the brushless motor through a mechanical connection.

10. The method of claim 9, wherein the mechanical connection is a v-belt and tensioner, and wherein the tensioner is positioned to provide variable pressure on the v-belt to overcome frictional forces associated with the connections between the brushless motor, the mechanical connection and the clutch.

11. The method of claim 8, wherein the clutch is a magnetic clutch and wherein the system control module causes the clutch to engage by sending a command signal to an A/C clutch control which in turn engages the magnetic clutch.

12. The method of claim 8, wherein the clutch is a one-way clutch tooth clutch that is engaged by the spin of the brushless motor in a direction that is opposite to the rotation of a vehicle engine.

13. The method of claim 8, wherein the first input is provided from a user through a graphical user interface.

14. The method of claim 8, wherein the first input is provided from the system control module upon detection that the vehicle engine has been shut off.

* * * * *